United States Patent [19]

Reischl et al.

[11] 4,287,069
[45] Sep. 1, 1981

[54] PROCESS FOR THE IMPROVED WORKING UP OF EFFLUENT

[75] Inventors: Artur Reischl, Leverkusen; Kurt Mack, Wuppertal; Friedhelm Sahlmen, Moers, all of Fed. Rep. of Germany

[73] Assignee: Bayer Aktiengesellschaft, Leverkusen, Fed. Rep. of Germany

[21] Appl. No.: 146,919

[22] Filed: May 5, 1980

[30] Foreign Application Priority Data

May 21, 1979 [DE] Fed. Rep. of Germany ....... 2920526

[51] Int. Cl.³ .......................................... C02F 11/14
[52] U.S. Cl. .................................. 210/609; 210/631; 210/735; 210/919
[58] Field of Search ............... 210/609, 631, 730, 735, 210/919, 714

[56] References Cited

U.S. PATENT DOCUMENTS

| 3,893,916 | 7/1975 | Argabright et al. | 210/735 |
| 3,942,970 | 3/1976 | O'Donnell | 210/609 X |

FOREIGN PATENT DOCUMENTS

| 2437367 | 2/1975 | Fed. Rep. of Germany | 210/609 |
| 49-57663 | 6/1974 | Japan | 210/631 |

Primary Examiner—Thomas G. Wyse
Attorney, Agent, or Firm—Gene Harsh; Joseph C. Gil

[57] ABSTRACT

The instant invention is directed to a process for the separation of aqueous sludges in the purification of effluents in purification plants, comprising:

(a) mixing organic and/or inorganic aqueous sludges with ground monomer-free tolylene diisocyanate (TDI) distillation residues having a mean particle size of less than 2 mm;
(b) removing the water from the resulting purified sludges; and
(c) disposing of the purified sludges.

9 Claims, 2 Drawing Figures

PROCESS FOR THE IMPROVED WORKING UP OF EFFLUENT

BACKGROUND OF THE INVENTION

This invention relates to a process for the purification of effluents by which the separation, working up and disposal of the sludges accumulating in mechanical and/or biological purification plants are improved.

In biological purification plants, the biological purification of effluent is carried out by means of microorganism. The organic constituents of the effluent are biologically eliminated. Under the conditions used, the microorganisms multiply to a praticularly marked extent, the organic impurities being assimilated by the microorganisms in the so-called activated sludge basins of the purification plants. Accordingly, some of the biomasses, consisting mainly of bacteria, have to be continuously removed from the activated sludge basins in the form of surplus sludge in order to maintain the optimal conditions for microbial effluent purification. For this reason, biomasses accumulate worldwide in extremely large and ever increasing quantities in the biological purification of industrial and communal effluents. In the Federal Republic of Germany alone, around two million metric tons (expressed as a dry weight) per year of these protein-containing biomasses are either dumped or burned. The necessary removal of the water from the activated sludge is a problem because, under the sedimentation conditions normally applied in practice in the intermediate and final settling tanks of purification plants, the activated sludge to be removed contains only about 1% by weight of microbial dry mass. The solids content can only be increased to around 3 to 9% by weight, depending on the type of sludge, by machine or static thickening. Even where polyelectrolytes are added, the solids content can only be increased to between 8 and 15% by weight by filtration or centrifuging.

Even in these low concentrations, the activated sludges have a pronounced gel structure and a relatively high viscosity due to the pronounced chemical and physical binding of the water to the microorganisms. For this reason, normal filtration or centrifuging is impossible without special treatment. Removal of the water is also complicated by the fact that the bacteria cells attract one another and form common, slimy shells, resulting in the formation of tacky flakes. In practice, therefore, inorganic sludges (for example of lime, asbestos flakes or insoluble metal oxides) are added to the surplus activated sludge in substantially the same to twice the quantity in order to facilitate removal of the water on an industrial scale by means of filter presses. In this way, a filter cake having a water content of around 50% by weight is obtained. FOr burning, however, the surplus activated sludge should have an organic matter content which is as high as possible. This is because the removal of water from the accumulating sludges, which have a relatively low concentration even where expensive organic polyelectrolytes are used as filtration aids, requires far more energy than can be obtained in heat equivalents during burning.

The problems outlined will increase in significance in the coming years. According to estimates of the Federal Ministry of the Interior of the Federal Republic of Germany (1975 Waste Economy Program of the Federal Government; Environmental Letter 13, 1976), the annual accumulation of treated sludge will have increased by 1985 to around 50 million cubic meters from communal plants plus another 30 million cubic meters from industrial plants, which for a water content of 95% represents approximately 4 million metric tons of dry purified sludge per year.

The sedimentation of activated sludges in the intermediate and final settling tanks must also be improved in regard to purification capacity and the often problematical working up, if the officially stipulated limits are to be observed. In addition, there is an economic need to optimize the water separation processes in order to save at least some of the flocculating agents which are currently being used in large quantities. Finally, either the cost of burning the surplus purified sludge will have to be reduced or, better still, new ecologically acceptable uses will have to be found. It would be preferred if such new uses were directed to the industrial recycling of the activated sludges which consist mainly of high-grade proteins, nucleic acids, enzymes and other valuable organic compounds.

The problems as stated above are solved to a large extent by the process according to the present invention.

DESCRIPTION OF THE INVENTION

It has surprisingly been found that several process steps in the purification of effluent (for example, in purification plants) can be considerably improved. This is accomplished by working up the purified sludges in the presence of so-called TDI distillation residue slags. These residue slags are used in the form of a comminuted powder or an aqueous suspension, of the type which automatically accumulate, initially in the form of coarse slags, during removal of monomeric tolylene diisocyanates by distillation on an industrial scale from the crude phosgenation products of tolylene diamines. The isocyanate-containing tar-like distillation residue may be stirred into water. The process according to the present invention is suitable both for biological industrial and/or communal purification plants and also for the preliminary clarification of industrial effluents having a solids content of less than 5% by weight, preferably less than 1% by weight.

Accordingly, the present invention relates to a process for the improved separation of organic and/or inorganic aqueous sludges in the purification of effluents in mechanical and/or biological purification plants by the addition of agents which accelerate separation of the sludge, characterized in that the separating agents used are powder-form distillation residues insoluble in water and organic solvents and have a mean particle size of less than 2 mm of the type which accumulate as slag after the removal of monomeric tolylene diisocyanates by distillation from the crude phosgenation product of tolylene diamines, optionally after stirring into water, and which have optionally been chemically modified by reaction with compounds that are reactive to the functional groups of the distillation residue, particularly the isocyanate groups.

As already mentioned, the distillation residues used in the process according to the present invention accumulate in conventional processes for the production of 2,4- and/or 2,6-tolylene diisocyanate ("TDI") on an industrial scale as relatively high molecular weight tar-like masses cross-linked through main valency bonds which are generally formed in a quantity of more than 10% by weight, based on the calculated quantitative yield of monomeric diisocyanates. To make them easier to handle, they may be introduced after distillation into water in a stirrer-equipped vessel, generally at a temperature above 130° C. and preferably at a temperature above 150° C. This results in the formation of a coarse, irregularly shaped insoluble slag through reaction of a large number of the free isocyanate groups with water to form polyurea groups (hereinafter referred to as "denaturing" of the TDI residue). Although this slag still contains free NCO-groups (generally less than 15% by weight, and usually from 1 to 10% by weight of free NCO-groups), it is substantially free from monomeric diisocyanates. In addition to the residual NCO-groups, the TDI residue slags contain urea, biuret, uretdione, isocyanurate, carbodiimide, uretone imine and, in some cases, even methyl benzimidazolone groups and their biuretization products in quantitative ratios varying according to the denaturing process. The slags are so highly cross-linked through these various functional groups that, even with a mean particle size of less than 5 $\mu$m, they are substantially insoluble in inert organic solvents even at boiling temperature. Examples of such inorganic solvents include methylene chloride, cyclohexane, cyclohexanone, toluene, xylene or dichlorobenzene. Even in boiling dimethyl formamide, the residue powders are only partly swollen but do not dissolve. On heating, only a very small proportion, if any, of the TDI distillation residues used in accordance with the present invention softens at a temperature above about 250° C., although beyond about 280° C. the distillation residues decompose without melting, giving off gases in the process.

The very coarse grained TDI residue slag, which is optionally wetted with water or suspended in water during the denaturing process in a stirrer-equipped vessel, is preferably first precomminuted to less than 3 mm in a comminuting machine, for example a cutting granulator or a hammer mill. The slag is then brought to the final particle size required for the particular application envisaged at any stage using known wet or drying grinding techniques.

In accordance with the instant invention, there is a preferred method for using TDI residue slags which accumulate in water or are wetted with water (e.g. the above-described denaturing process carried out on an industrial scale). This process may also be used where the residue can, without difficulty, be partly chemically reacted with the purified sludges suspended in the water of the settling basins. It is economical and better for the environment to wet grind the coarse TDI slag. The slag may be wetted with generally about 0.3 to 3% aqueous sludge suspension of the settling tank. The grinding may be done in a batch process or, better still, continuous machines. Two machines may even be used in sequence. The concentration of solids in these mixtures during wet grinding is preferably about 10 to 45% by weight. The wet grinding may be done in tube and ball mills, toothed colloid mills, trigonal gear ring mills, corundum disc mills and stirrer-equipped ball mills. The mills vary in the size of the grain which they can produce.

The TDI residue slags obtained after wet grinding which contain different quantities of free NCO-groups, depending on the procedure adopted, are used either in the form of very finely divided suspensions or pastes or in the form of powders in the same way as the TDI residue powders obtainable by dry grinding.

TDI residue slags which have been preground to less than from 2 to 3 mm and predried, preferably at a temperature below 50° C., and which have a moisture content of not much more than 15% by weight, and preferably less 5% by weight, are used for dry grinding. The choice of the particular machines used for dry grinding is essentially governed by the final particle size and particle size distribution required and by the grinding costs. In comparison with plastics, the residue slags used in accordance with the present invention are very hard. By virtue of their high degree of cross-linking, they may be gound without softening at a temperature of up to about 220° to 300° C. in conventional size-reducing machines free from any cooling problems, which is particularly important for obtaining very fine particle sizes.

Grinding may be carried out, for example, in pinned-disc mills, ball mills or baffle plate mills. Grinding may also be carried out in air-stream mills, such as crossbeater mills, gear ring mills or turbine mills, although it is particularly advantageous to use steam-jet or air-jet mills. This is becuase, in mills of this type, size-reduction is primarily obtained by interparticle collisions and secondarily by wall collisions and then very fine particle sizes may be obtained in a single passage. Dry grinding may, of course, also be carried out by single-stage and multi-stage, batch-type or continuous grinding processes.

Before they are used in the process according to the present invention, the TDI residue powders may be subjected to a variety of different chemical modifications. These modification reactions, some of which may even be carried out during the grinding process, may take place in the gaseous phase and also in the presence of a liquid reaction medium. In these reactions, it is primarily the small quantities of free isocyanate groups still present in the TDI residue powders which are reacted. Thus, it is possible, for example, to pass ammonia gas or gaseous amines through the finely ground TDI distillation residue, preferably on the countercurrent principle. The free isocyanate groups quickly react off (in less than one minute depending on the fineness of the powder) in an exothermic reaction even in the absence of mechanical mixing. This gives rise to the formation in the TDI distillation residue of additional urea groups which can easily enter into condensation reactions with carbonyl compounds, particularly formaldehyde, which may optionally be passed through the powder at the same time as, or after, the reaction with ammonia or amines. Instead of using formaldehyde-ammonia mixtures, it is also possible to use hexamethylenetetramine under hydrolyzing conditions to form methylene urea bridges. Suitable volatile amines are, for example, ethylamine, dimethylamine, butylamine, dibutylamine, ethylene diamine and propylene diamine. In addition to formaldehyde, suitable carbonyl compounds are, for example, acetaldehyde, propionaldehyde, butyraldehyde, acetone or methylethyl ketone.

Another modification reaction in the gaseous phase is reaction with steam. Whereas the reaction of the free isocyanate groups in the finely powdered residue slag with steam only takes place slowly at a temperature below 100° C., even in cases where very finely ground TDI distillation residues are used, quantitative polyurea formation may be quickly obtained by applying reaction temperatures distinctly above the boiling point of water and preferably above 130° C. If adequately size-reduced TDI residue slag is used, it is generally sufficient to expose it to the above-mentioned temperatures wetted with water without any need for further mixing. Similarly, it is, of course, possible to use aqueous ammonia, aqueous amine solutions or alcohols and carboxylic acids in gaseous form for modification reactions with the free NCO-groups, for example methanol, ethanol, propanol, isopropanol, butanol, ethylene, glycol, formic acid or acetic acid.

Reactions suitable for modifying the TDI residue powder in water or an organic inert solvent as the reaction medium are, above all, catalyzed reactions of the free isocyanate groups with one another. Examples include the formation of uretdione groups in the presence of dimerization catalysts, such trisubstituted phosphites, or the formation of carbodiimide groups in the presence of phospholine oxide. Another possible modification reaction is the addition of, for example, bisulfite or other isocyanate donors to the free isocyanate groups of the powdered TDI residue slag of weakly acidic compounds which may subsequently be split off again at any time by applying elevated temperatures with liberation of the isocyanate groups. It is, of course, also possible to carry out a variety of different modification reactions in the liquid phase using compounds which contain groups reactive, in particular, to the isocyanate groups of the residue powder (particularly hydroxyl, amino and/or carboxyl groups). Anionic and/or cationic groups or groups capable of salt formation may also be introduced to the residue powder by modification reactions of this type. Most of these compounds not only react with the free NCO-groups of the residue, but they also react with its carbodiimide bonds. Suitable monohydric and polyhydric alcohols, amines and carboxylic acids which may optionally contain further functional groups (for example, ionic groups and/or groups capable of salt formation) are described, for example, in German Offenlegungsschriften Nos. 2,550,796 and 2,550,797 as reactants for polyisocyanates in the in situ production of polyisocyanate polyaddition products in polyhydroxyl compounds. Amines suitable for modification reactions are also described in German Offenlegungsschrift No. 2,714,289. Suitable carboxylic acids are described in German Offenlegungsschrift No. 2,714,293 (in connection with the addition of these compounds with carbodiimide groups). It is also possible in accordance with German Offenlegungsschrift No. 2,714,292 to add phosphites with the carbodiimide bonds of the TDI residue powder to form phosphonoformamidine groups. It is, of course, also possible to carry out the above-described modification reactions with carbonyl compounds in a liquid reaction medium. Suitable carbonyl compounds are described, for example, in German Offenlegungsschrift No. 2,639,254.

In addition to water, suitable reaction mediums for the above-mentioned modification reactions are the known organic solvents which boil at a temperature preferably below 150° C. and, with particular preference, at a temperature below 130° C. but which, as mentioned above, are essentialy nonsolvents for the powdered TDI distillation residue, i.e. they merely act as suspending agents.

Examples of organic solvents such as these are methylene chloride, acetone, petroleum ether, cyclohexanone, ethylacetate, tetrahydrofuran, benzene, toluene and xylene. After the modification reaction, the liquid reaction medium may be removed by filtration and drying or by distillation. In many cases, it is sufficient to use only very small quantities of the liquid reaction medium (frequently less than 10% by weight based on the residue powder) in order to dissolve the modifying agent or to disperse it uniformly in the TDI residue powder. In cases where they require temperatures above the boiling point of the solvent used, the above-mentioned modification reactions are carried out in a pressure vessel.

The very finely ground NCO-containing or NCO-free TDI residue slags may also be converted into hydrophilic aromatic polysulfonic acid derivatives, for example in suspension in chlorinated hydrocarbons. This may be accomplished by reacting the residue with sulfur trioxide or chlorosulfonic acid, followed by hydrolysis. Some of the sulfonic acid groups enter into the addition reactions with the carbodiimide groups present.

With amines, ammonia or alkali, the corresponding aryl sulfonic acid salts are formed. If compounds containing tertiary nitrogen have been introduced into the residue powder by the reactions described above, the sulfone acid TDI residue powders can form amphoteric systems where both the positive charge and also the negative charge are situated in the same molecule. In many cases, separately produced anionic and cationic TDI residue powders may even be mixed in any ion equivalent ratio and used as precipitation aids.

According to the present invention, the TDI residue powders may also be mixed at any time with powder-form polymeric hydrocyanic acid (so-called azulminic acids). Azulminic acids also contain reactive groups (particularly amino groups) which are capable of reacting both with addable groups of the TDI residue (for example, NCO-groups and carbodiimide groups) and also with the modifying agents (for example, carbonyl compounds) optionally used in the working up of the residues. Processes for producing azulminic acids and for stabilizing them against the elimination of hydrocyanic acid are described in Houben-Weyl, Methoden der Organ. Chemie (1952), Volume 8, page 261, in Angew. Chem. 72 (1960), pages 379-384; in German Pat. Nos. 662,338 and 949,600 and in German Offenlegungsschriften Nos. 2,806,019 and 2,806,020.

Further particulars on the production of the TDI residue powders used in the process according to the present invention may be found in German Offenlegungsschrift No. 2,846,815.

The addition of TDI residues (optionally chemically modified) to the sludge in accordance with the present invention facilitates or improves in particular the following process steps and disposal measures in the working up of communal and industrial effluents:
(1) the settling of (activated) sludges in the intermediate and final settling tanks;
(2) the removal of water from the sludges by filtration and/or centrifuging with simultaneous saving of flocculating agents;
(3a) the burning of the purified sludges which may still contain relatively large quantities of water with simultaneous utilization of the TDI residues used as energy sources;

(3b) the use of the purified sludges irreversibly denatured by chemical reactions in the plastic industry and/or agriculture.

(1) SETTLING OF THE SLUDGES

The activation tanks of standard purification plants preferably contain around 5 g/l of dry activated sludge which, in general, can only be concentrated to just about twice the quantity, i.e. to around 10 g/l, by settling in the settling tanks. This requires, however, extremely large intermediate and final settling tanks.

If from around 10 to 80% by weight, preferably from 30 to 60% by weight, based on the total solids including TDI residue, of the (optionally chemically modified) TDI residue having a mean particle size of from 0.005 to 2 mm, preferably from 0.03 to 0.8 mm and, with particular preference, from 0.05 to 0.5 mm (the maximum particle size preferably being less than 1 mm) are introduced in accordance with the present invention into the settling tanks, a sediment highly reduced in volume is obtained. Using substantially the same quantities of activated sludge and TDI residue, the sediment obtained has a solids concentration at least twice as high as without the TDI residue. In other words, the total sludge volume is reduced by about half in this way despite the fact that the solids content is doubled by the addition of ground TDI residue slag.

Since (even when they contain free NCO groups) the TDI residues surprisingly have virtually no effect on the biomasses when used in the quantities indicated above at the process temperatures normally applied in practice in purification plants (around 10° to 35° C.) (in other words, are biologically inert), it is even possible in accordance with the present invention to introduce the ground TDI residues into the actual activation tanks and to allow them to overflow together with the biomass into the settling tanks where the considerably improved sedimentation then takes place.

The accelerated sedimentation in the settling tanks provides for a higher through put of effluent. In purification plants already operating at full capacity, additional settling capacity is created in this way which, in many cases, makes it unnecessary to construct further settling tanks. In the construction of new settling tanks, the present invention provides for considerable reductions in size.

To determine the optimal grain size and grain size distribution of the residue and to adjust the most favorable ratio by weight between the TDI residue and dry activated sludge mass, it is best (after a preliminary selection by laboratory sedimentation tests on a scale of from 0.5 to 1.1) to carry out tests over a period of several days with the special sludge accumulating in a purification plant and using various grain sizes. The residue may optionally be denatured or modified with water and/or by other chemical reactions for the particular type of effluent being treated. Different types of modification of the TDI residues may optionally be tested in accordance with the present invention by means of a simply constructed pilot plant holding around 100 liters of purified sludge. As will be described in detail in the Examples, 1 liter samples of the activated sludge should be taken once daily from the backflow after an equilibrium has been reached between the activation vessel and the settling vessel. In an identical pilot plant operated in parallel, activated sludge is studied under the same conditions, but without any TDI residue, 1 liter samples of the activated sludge is again taken from the backflow for comparing the sedimentation behavior and the solids content. The sludge volumes of the samples are measured, for example, after standing for 30 minutes and, for the same biomass content, may be directly compared with one another. In this way, the volume-reducing influence of the particular TDI residue added in accordance with the present invention on the sludge sediment may be estimated extremely accurately as early as on the first test day. In the test plant, the content of insoluble substances in the water running off, the COD (chemical oxygen demand) and TOC (total organic carbon) values and the multiplication rate of the biomass may also readily be determined over a period of about one week. These results are entirely adequate to choose TDI residues to be used in accordance with the present invention for large-scale tests in 5,000 to 10,000 cubic meter activation and settling tanks.

(2) REMOVAL OF WATER FROM THE PURIFIED SLUDGES

The quantities of activated sludge/TDI residue sediment required for optimizing this second process step may also be determined from the pilot plant mentioned above and described in detail in the Examples. Preliminary tests are carried out to determine how much of the soluble polyelectrolytes normally required as flocculation aids for the removal of water in conventional units (for example, sieve belt presses, vacuum rotary filters, chamber filter presses or in centrifuges, such as decanter centrifuges) can be saved.

It has surprisingly been found that, despite their insolubility in water, TDI residues modified with cationic groups are such effective dewatering aids that (particularly where centrifuges and/or decanters are used) for comparable throughputs, there is no need for the very expensive water-soluble polyelectrolytes normally used.

(3) DISPOSAL OF THE PURIFIED SLUDGES

The TDI residues used in accordance with the present invention are also advantageous in the third process step, namely disposal.

In practice, the purified sludges are burned, for example, in fluidized bed furnaces whose fluidized bed contains quartz sand. The filtered purified sludge is generally introduced into the furnace in the form of a 10 to 15% filter cake. At the same time, considerable quantities of heating oil or mineral or brown coal have to be introduced as energy carriers for evaporating the water. By using the TDI residues in accordance with the present invention in one or both of the process steps discussed above (sedimentation and concentration) not only is the water content of the activated sludge/TDI residue concentrate significantly reduced, based on the biomass, but the additional energy carriers can also be saved. In this way, the capacity of the fluidized bed furnace, which for a given grate area is essentially determined by the water content of the material to be burned, is increased and the otherwise necessary burning of valuable energy carriers is rendered superfluous.

In practice, increasing significance is being attached not only to the burning of the purified sludges still having a relatively high water content, but also to the substantial removal of water therefrom to obtain purified sludge powders containing only about 3 to 7% by weight of water. These biomass powders are only partly denatured, as reflected in the fact that they are revitalized by stirring in water, even at room temperature. These powders may, of course, also be burned. Another possibility is to store them in dumps. It has not yet been possible, however, to find a commercially and ecologically acceptable use for these powders on account of the unbearable odor of the dried purified sludges.

The already relatively highly concentrated sludges which accumulate in the process of the invention naturally facilitate drying. In addition, polyaddition reactions take place between the reactive groups of the TDI residue (NCO groups and also carbodimide, uretdione and uretone imine groups) and the functional groups of the purified sludge biomasses (for example, their amino groups) at the drying temperatures of up to about 130° C. normally applied in practice. These reactions are accompanied by linkage of main valency bonds between the macromolecules of the TDI residues and the purified sludge biomass. There is, hence, a considerable change in the structure of the biomass, in some cases even to the point of complete denaturing. The denaturing process and the substantially odorless or even completely odorless powder-form new products obtained by the process are separately claimed in a copending application. The above-mentioned denaturing reactions may be supported particularly effectively by the addition of carbonyl compounds (particularly formaldehyde) and optionally compounds capable of aminoplast formation (for example, urea or substituted ureas) during the removal of water from the sludges consisting of biomass and TDI residue as described in detail in co-pending U.S. application Ser. No. 84,002. The biologically fully active denatured powders thus obtained may be used, for example, in agriculture as soil improving agents with a long-term fertilizing effect or as reactive fillers in the production of homogeneous or cellular plastics.

The process according to the present invention may also be used for the purification of effluents of the type which accumulate during the commercial production or carbon monoxide. These effluents, which hitherto have also been treated in purification plants, contain very small quantities (around 100 to 200 ppm) of fly ash (for example, metal oxides) as inorganic suspended matter with a particle size of less than $1\mu$ to around $20\mu$. These washing waters accumulating in the commercial production of CO have also caused considerable problems in the past because they cannot be concentrated sufficiently quickly in settling tanks or effectively filtered.

However, if the optionally denatured TDI residues ground to a particle size of less than 1 mm, preferably less than 0.5 mm, are added to these washing waters (this may even be done at the factory) in a quantity of around 20 to 100% by weight, based on the content of inorganic suspended matter, the extremely fine inorganic impurities are sedimented more quickly by a factor of about 3 to 10 and also substantially quantitatively. In this variation of the process according to the present invention, from 2 to 10 ppm, preferably about 5 ppm, of phosphate ions (in the form of phosphoric acid or preferably phosphates) dissolved in water are preferably added to the effluent as well, whereby the sedimentation process is further accelerated synergistically (by a factor of up to about 30). The supernatant, completely clear aqueous phase obtained after sedimentation of the suspended matter does not cause any reflocculation when mixed with new effluent so that it is possible to directly recycle most of the clarified water recovered after the extremely rapid sedimentation of the impurities for the washing of carbon monoxide. Simple filtration of the sedimentation residue either continuously or in batches gives an approximately 30 to 50% sludge concentrate which, in the same way as the TDI residues themselves, may be used in purification plants for the improved removal of water from purified sludges.

The process according to the present invention is illustrated by the following Examples in which the quantities quoted represent parts by weight and percentages by weight unless otherwise indicated.

(A) Sedimentation, filtration and burning of purified sludges

The TDI residues I and II were obtained from the monomer-free distillation residue automatically obtained in the production of monomeric tolylene diisocyanate by stirring the 150° to 200° C. hot tar-like melt (sump phase of distillation) into water with "denaturing", followed by pregrinding in a hammer mill in the presence of from 4 to 8% of moisture and fine-grinding in an air-stream mill. After grinding, TDI residue II was tempered for 6 hours at 130° C. in the presence of moisture in a recirculating air cabinet.

| Characteristic | TDI Residue I | TDI Residue II |
|---|---|---|
| Particle size ($\mu$m) | <600 | 100–315 |
| Isocyanate content (% by weight) | 4 | 0 |
| Solubility in water | nil | nil |
| Odor | none | none |

The isocyanate content was determined by titrating a sample ground to less than 60 $\mu$m in acetone at 50° C.

Figure 1:
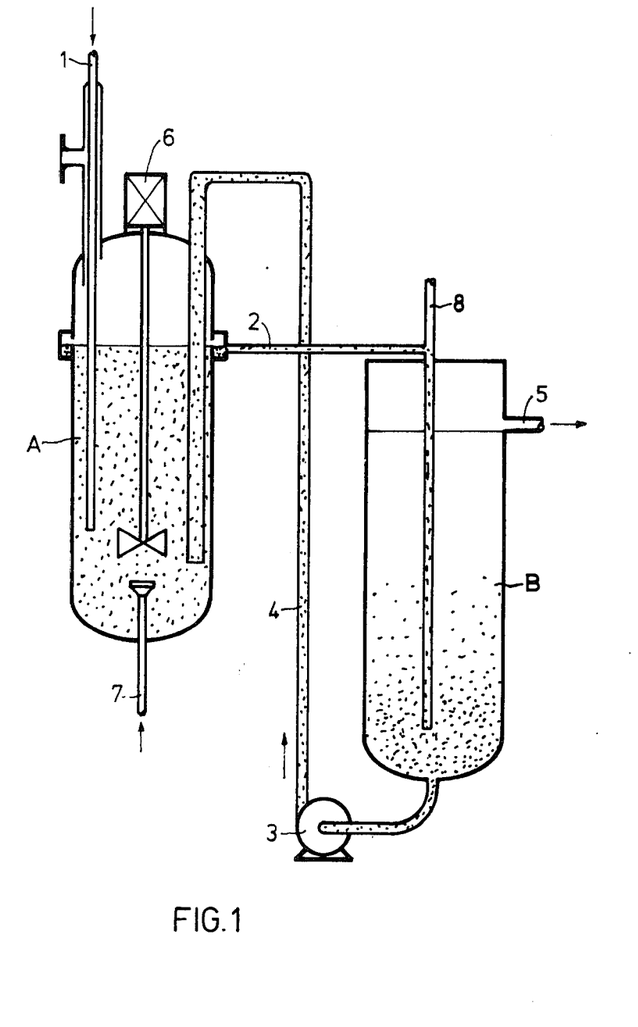
FIG. 1 diagrammatically illustrates a pilot plant for the sedimentation of purified sludges with TDI residue powders.

FIG. 1 diagrammatically illustrates a pilot plant in which the sedimentation of purified sludges with TDI residue powders may be studied.

The effluent to be purified is introduced through the feed pipe (1) into the activation vessel (A) (capacity 42 liters) from which it flows through the overflow (2) into the settling tank (B) (capacity 48 liters). Some of the sedimented purified sludge is returned from (B) to (A) via a return pipe (4) by means of a pump (3). The clarified effluent leaves the settling vessel (B) through the outlet (5).

By means of a stirrer (6), the effluent is thoroughly mixed in (A) (stirrer speed: approximately 600 to 900 r.p.m.) and at the same time is supplied with atmospheric oxygen through the feed pipe (7). The overflow can be vented at (8).

EXAMPLES

EXAMPLES 1 AND 2 WITH COMPARISON TESTS

The comparison tests are each carried out in a parallel plant using the same purified sludges as used in the Example from the everyday operation of a fully biological purification plant but without any addition of TDI residues.

(a) Sedimentation

General procedure (of FIG. 1)

A purified sludge sample of, in all, 90 liters is introduced into the activation vessel (A). Commensurate with the overflow, it also fills the settling vessel (B). In the test run according to the present invention, the TDI residue I or II is added either in the form of a dry powder or in the form of an aqueous suspension. No TDI residue is added in the comparison tests conducted at the same time.

The inflow of the biowater to be purified, the outflow of the fully biologically purified water and the volume of the recycle sludge are adjusted to a throughput of 7 liters per hour so that the average residence time in the activation vessel amounts to about six hours. By introducing air from 0.5 to 1 mg/l of oxygen is kept in solution. A stirrer oxygen frit provides for uniform mixing.

The test duration amounts in each case to one week at room temperature. One liter sludge samples are taken once daily from the return or backflow and diluted with the same volume of water. The volume of the sedimented sludge per liter in the individual samples is measured after standing for thirty minutes.

The measured values are shown in the following Table.

The percentage dry matter content and ignition loss (IL) of the undiluted activated sludge sample are measured. In addition, the purity of the water flowing off is compared by determining the COD and TOC values and the quantity of undissolved substances (suspended matter).

The following measured values represent the average values of samples taken on seven successive days at the same time:

|  | Comparison tests without TDI residue | Example 1 with TDI residue I | Example 2 with TDI residue II |
|---|---|---|---|
| Volume of sludge (ml) in the activated sludge after 30 mins. | 680 750 | 260 | 310 |
| Dry matter content the activated sludge (%) | 1.00 1.08 | 1.95 | 1.61 |
| Ignition loss (% by weight) | 77.9 74.0 | 87.3 | 86.2 |
| COD (mg/l of water flowing off) | 990 1160 | 1160 | 980 |
| TOC (mg/l of water flowing off) | 237 137 | 137 | 235 |
| Residual suspended matter in the water flowing off (mg/l) | 125 135 | 95 | 75 |

Solids ratio between activated sludge and TDI residue I or II:
Example 1: 1:1
Example 2: 2:1
COD = chemical oxygen demand
TOC = total organic carbon
(determined in accordance with the Standard German Process for examining water: specification H4).

Figure 2:
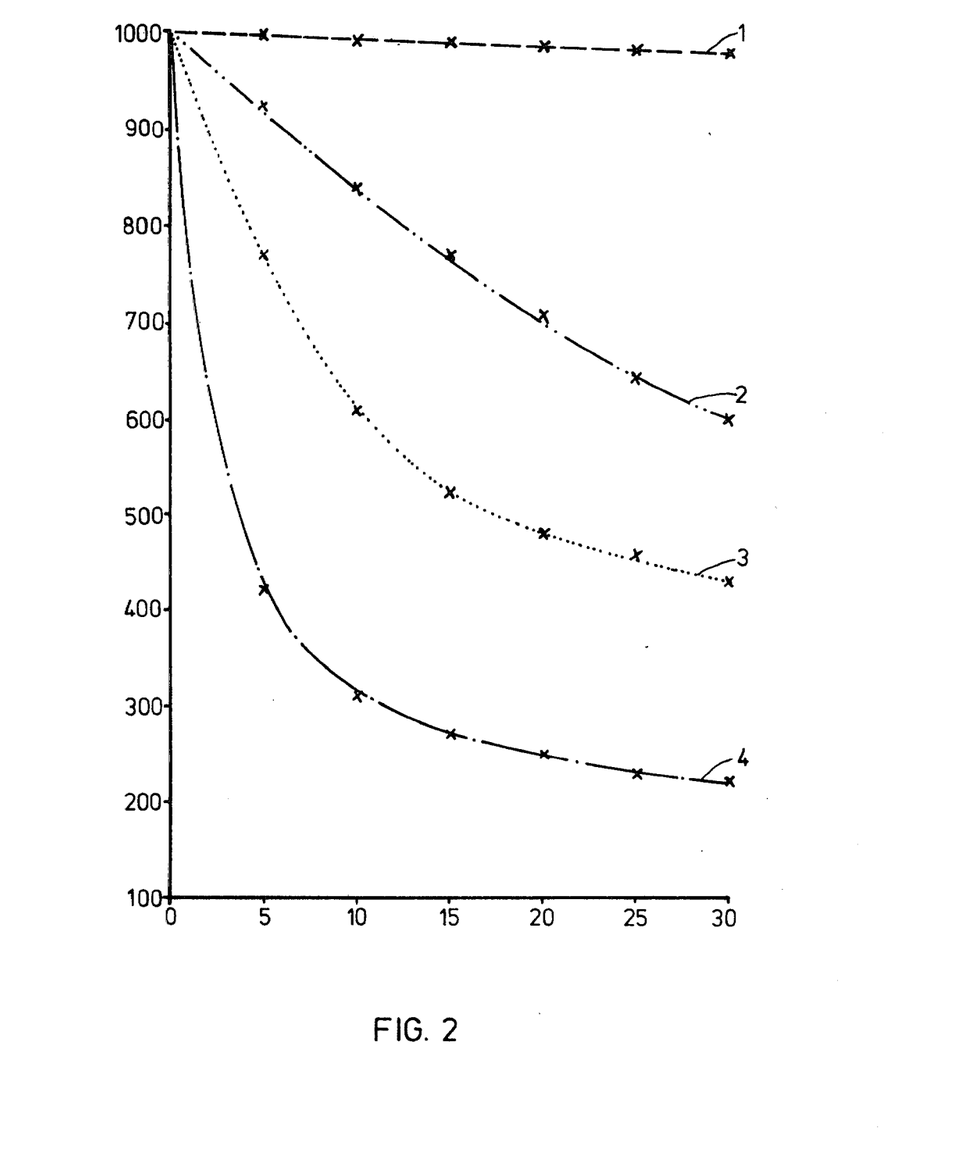
FIG. 2 illustrates the sedimentation behavior of the activated sludge of Example 2 and a corresponding comparison test.

FIG. 2 illustrates the sedimentation behavior of the activated sludge of Example 2 (addition of TDI residue II) and the corresponding comparison test. The measured values again represent the average values of the samples taken once daily over a period of one week. The settling time in minutes is recorded on the abscissa and the volume of the sedimented phase in ml on the ordinate (the total volume of the tested sample amounts to one liter in each case).

Curve (1) represents the comparison test (without the TDI residue). For curve (2), the comparison test sample was diluted with water in a ratio of 1:1. Curve (3) represents the activated sludge samples taken in accordance with Example 2. For curve (4), these sludge samples were again diluted with water in a ratio of 1:1.

Comparison of curves (1) and (3) and of curves (2) and (4) shows the considerable improvement in sedimentation behavior obtained in accordance with the present invention.

(b) Filtration

The filtration tests were carried out using an industrial sieve belt press (belt width 20 cm; belt length, upper side, 80 cm; mesh width 224×464 μm).

In a stirrer-equipped vessel, a freshly prepared solution of a commercial cationic polyelectrolyte based on polyamide is added to the sedimented activated sludge test samples in such a large quantity that the purified sludge is immediately flocculated and the filter cake drops off easily and quantitatively at the end of the belt (figures quoted in the following Table represent the average values of 10 tests).

|  | Comparison tests Examples 1 and 2 | Example 1 | Example 2 |
|---|---|---|---|
| Quantity of polyelectrolyte (comparison tests = 100%) | 100 100 | 58 | 66 |
| Dry matter content of filter cake (% by weight) | 12.5 12.8 | 32.2 | 28.4 |
| Residual suspended matter content of filtrate (ml/l) | 20 24 | 1 | 3 |

(c) Burning the sludges obtained in accordance with the present invention

In comparison with the comparison tests, a 26% reduction in the grate area, expressed as purified sludge, is required in Example 1 and a 43% reduction in Example 2 for burning the filter cake in a fluidized bed furnace. In other words, for a given grate area, the throughput of purified sludge can be increased by a factor of 1.30 in Example 1 and by a factor of 1.75 in Example 2, based in each case on the comparison tests.

In addition, around 25,000 KJ of heating oil or coal is saved per kilogram of TDI residue burned.

(B) Centrifuging, aftertreating and drying purified sludges

Like residues I and II, the TDI residues III to V used in Examples 3 to 5 are obtained in the form of coarse slags having an included residual isocyanate content of from 4 to 8% by stirring the tar-like NCO-containing sump product obtained in the production of tolylene diisocyanates into from 3 to 4 times the quantity of water. After the water had been run off, the slag, which still contained from 6 to 10% water, was preground to less than 1 mm in a hammer mill, suspended in water to form a 30 to 45% suspension, to which the NCO-equivalent quantity of ammonia was added, and ground to smaller than 160μ in a stirrer-equipped ball mill (Example 3) and to smaller than 500μ in a toothed colloid mill (Example 4).

The cationic TDI residue V was produced as follows in accordance with German Offenlegungsschrift No. 2,846,815:

Formulation 121.8 parts of a TDI residue containing polyurea groups, but free from isocyanate groups which has been completely denatured with water, preground in 40% aqueous suspension in a toothed colloid mill and concentrated to 77% by filtration under suction (particle size <500μ);

17.1 parts of 3-amino-1-dimethylaminopropane;
18.4 parts of 37% aqueous formaldehyde solution;
77.5 parts of water; and
32.7 parts of 85% phosphoric acid diluted with
39.1 parts of water.

Reaction Conditions

The ground TDI residue is suspended in water in a stirrer-equipped vessel and the amino-formaldehyde mixture quickly added to the resulting suspension at room temperature, gentle heating occurring. The internal temperature is brought to 70° C. by heating, and half the dilute phosphoric acid is added. After the temperature has been increased to 80°–90° C., the rest of the phosphoric acid is introduced, a pH value of approximately 2.8 being spontaneously adjusted.

The temperature is maintained for another 90 minutes, after which the contents of the vessel are cooled and introduced into a pressure filter.

The filter cake is washed once and isolated in the form of a 71% purified sludge flocculation aid.

EXAMPLES 3 TO 5 AND COMPARISON TESTS

Sludges from a fully biological purification plant are concentrated by means of TDI residues in a decanter centrifuge (a stationary throughflow volume of approximately 8 liters). In the following Examples, the solids ratio between the activated sludge and the TDI residue amounts to 18:15. A sludge taken fresh from a purification plant (solids concentration 1.7%) was used. When indicated, a cationic polyamide was added as a conventional flocculant, 100% corresponding to that quantity which was used in the comparison tests (without the TDI residues). The content of residual suspended matter in the aqueous phase of 5 liter sample was measured after standing for 3 minutes.

are boiled for from 2 to 4 hours at a pH of from 3 to 5 (phosphoric acid) with the additions indicated in the following Table in a stirrer-equipped vessel, filtered in a pressure filter and washed twice with water. The filter cake has a solids content of more than 50% by weight.

| Example | Sludge concentrate Solids (% by weight) | Formaldehyde | Urea | Solids content of the filter cake (% by weight) |
|---|---|---|---|---|
| 3 | 18.4 | 2.4 | — | 51 |
| 3 | 18.4 | 15.0 | 10.0 | 58 |
| 4 | 26.2 | 2.0 | 1.0 | 53 |

Treated under otherwise the same conditions, the comparison samples of purified sludges which were concentrated in the decanter centrifuge without the addition of TDI residue can only be suction-filtered with extreme difficulty, if at all, and even then with a considerably lower solids content.

The moist material is dried on metal plates in a recirculating air drying cabinet to a residual water content of 20% by weight, preferably less than 5% by weight. The substantially odorless product may be used as a long-term fertilizer and soil-improving agent.

For use as a reactive filler for modifying plastics, additional tempering for from 2 to 3 hours at from 130° to 150° C. is advantageous. The residual water may be completely eliminated. An improvement in odor is obtained at the same time.

What is claimed is:

1. A process for the separation of aqueous sludges in the purification of effluents in purification plants, comprising:
    (a) mixing organic and/or inorganic aqueous sludges

| Example | Throughput (l/hour) | Flocculating agent (%)* | TDI residue | Mean residence time in the separator (sec.) | "Supernatant Phase" (residual sediment) (% by volume) | Solids content of sludge concentrate (% by weight) |
|---|---|---|---|---|---|---|
| 3 | 1300 | — | III | 1.4 | 1.6 | 18.4 |
| 4 | 1500 | — | IV | 0.7 | 1.2 | 25.2 |
| 4 | 1900 | 35 | IV | 0.7 | 0.6 | 24.5 |
| 4a | 2400 | — | V | 0.7 | 0.3 | 27.6 |
| 5 | — | — | — | — | — | — |
| Comparison tests | 250 | — | — | 2.7 | 22.5 | 7.8 |
|  | 1600 | 100 | — | 1.4 | 3.2 | 9.2 |

*Conventional cationic water-soluble polyamide : ® NALCO 48-Z (b) Drying the sludge concentrates The residual water may be removed in the conventional way in continuous drying installations in which the material to be dried is exposed to a temperature of up to about 130° C. (for a total of about 15 to 40 minutes). Formaldehyde and, in addition, urea may optionally be added to the purified sludge/TDI residue mixtures characterized in Examples 3 to 5 if the end product is to be used as a nitrogen fertilizer in agriculture.

The Examples show the process products may be rapidly dried with substantial chemical modification in a simple batch-type comparison arrangement.

General Procedure

The sludge concentrates obtained in accordance with the present invention (Examples 3 to 5), which consist of activated sludge and the characterized TDI residues, with ground monomer-free tolylene diisocyanate (TDI) distillation residues having a mean particle size of less than 2 mm;

(b) removing the water from the resulting purified sludges; and (c) disposing of the purified sludges.

2. The process of claim 1, wherein said TDI distillation residues have been prereacted with isocyanate-reactive compounds.

3. The process of claim 1, wherein said ground TDI distillation residues have a mean particle size of 1 mm or less.

4. The process of claim 3, wherein said ground TDI distillation residues have a mean particle size of 0.03 to 0.8 mm.

5. The process of claim 1, wherein said TDI distillation residues are denatured by adding to water with a temperature above 130° C.

6. The process of claim 1, wherein the isocyanate groups of said TDI distillation residues are completely reacted with water and/or isocyanate-reactive compounds.

7. The process of claim 1, wherein said TDI distillation residues contain cationic and/or anionic groups.

8. The process of claim 1, wherein said TDI distillation residues are added in a quantity of from 10 to 80% by weight, based on the total solids.

9. The process of claim 1, wherein said TDI distillation residues are mixed with said aqueous sludges in an activated sludge tank.

* * * * *